(No Model.)

C. H. MITCHAMORE.
STICKY FLY PAPER.

No. 537,060. Patented Apr. 9, 1895.

WITNESSES
D. W. Bradford
F. Clough

INVENTOR
Charles H. Mitchamore
by Parker & Burton
Attorneys.

UNITED STATES PATENT OFFICE.

CHARLES H. MITCHAMORE, OF DETROIT, MICHIGAN, ASSIGNOR TO THE DECOY FLY PAPER COMPANY, LIMITED, OF SAME PLACE.

STICKY FLY-PAPER.

SPECIFICATION forming part of Letters Patent No. 537,060, dated April 9, 1895.

Application filed August 15, 1892. Serial No. 443,140. (No specimens.)

*To all whom it may concern:*

Be it known that I, CHARLES H. MITCHAMORE, a citizen of the United States, residing at Detroit, county of Wayne, State of Michigan, have invented a certain new and useful Improvement in Sticky Fly-Paper; and I declare the following to be a full, clear, and exact description of the invention, such as will enable others skilled in the art to which it pertains to make and use the same, reference being had to the accompanying drawings, which form a part of this specification.

My invention relates to traps for catching insects, and has for its object improvements in what is known to the trade as "sticky fly paper," consisting of a tablet, generally a sheet of paper, upon which is spread a layer of sticky material sufficiently adhesive to hold any fly or similar insect that comes in contact with the sticky surface.

Among the results which I desire to accomplish are, first, to allure or decoy the insects; second, to hold them after they have once come in contact with the sticky surface of the trap; third, to so arrange the sheets that a large number of them may be packed for shipment in a small space; and fourth, when so packed, the sticky material will be prevented from escaping from its proper place on the sheet of paper.

Sheets of paper that have been prepared on a commercial scale for insect traps, must frequently be shipped long distances, and remain in boxes or packages in which they were originally stored for considerable periods of time before being used. Provision should be made for handling the sheets without touching the sticky substance and provision must be made to prevent the paper from curling up and becoming wrinkled or wavy. All these results I accomplish by means shown in the accompanying drawings, in which—

Figure 1:
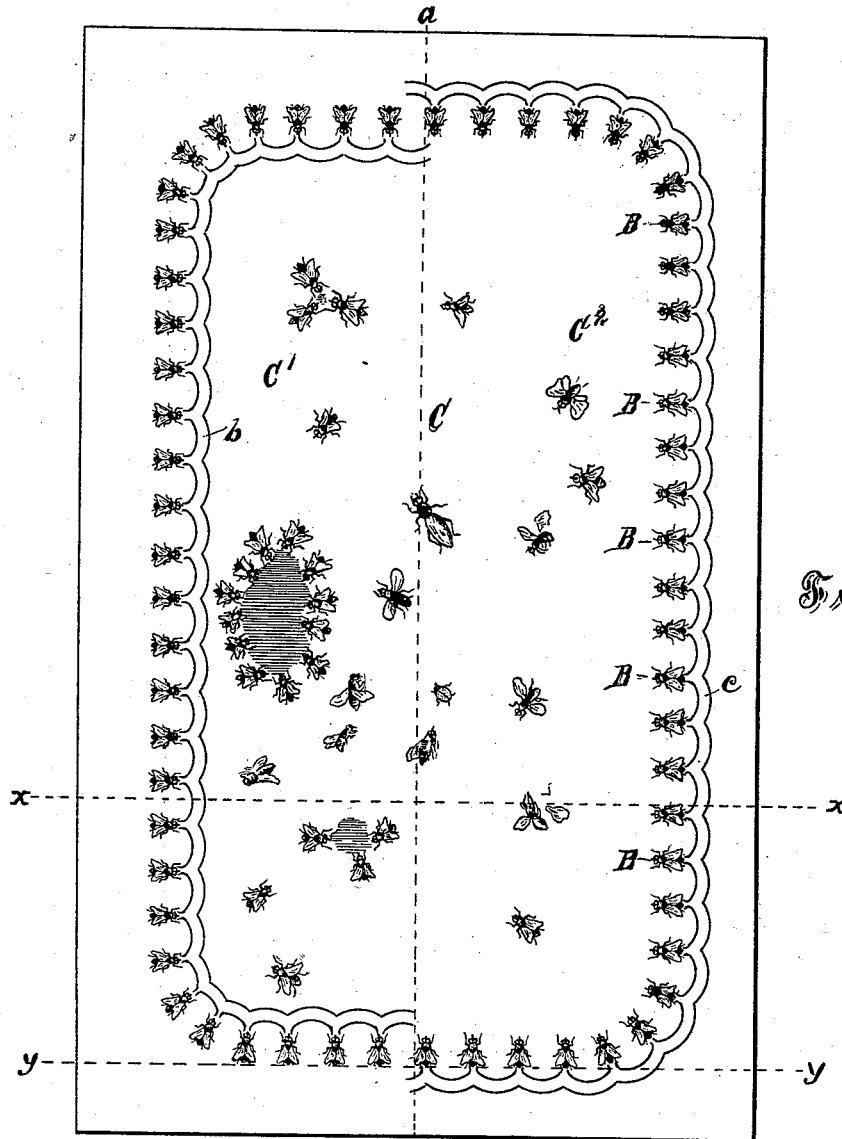
Figure 2:
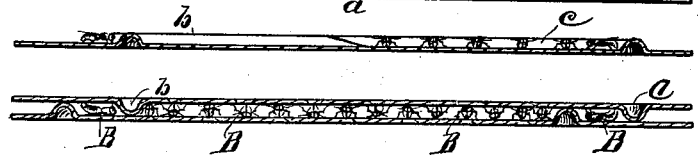
Figure 3:
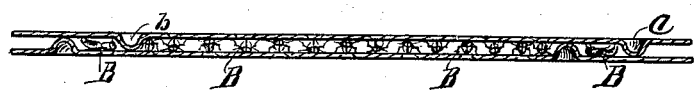

Figure 1, shows a finished sheet of fly paper. Fig. 2, shows a cross section at $x, x$, of Fig. 1. Fig. 3, shows a cross section at $y, y$, of Fig. 1, two sheets being shown as though placed face to face.

As a basis of the completed product, I employ a sheet of paper, preferably manila, which is prepared with a glazed surface produced by sizing and calendering the ordinary paper. On the surface of this sheet I imprint irregular groups of pictures of flies. Around the border I print a line of pictures regularly spaced, the pictures on the one side being opposite to the spaces on the opposite side. I then emboss these pictures indenting the paper at the back and raising the surface. In front (toward the center of the sheet), of the line of pictures forming the border on one side of a middle line $a, a$, is a corrugated or embossed or raised line $b$, extending unbroken around one part of $C'$, the inclosure C. Behind the line of pictures, forming the border, on the other side of the middle line $a, a$, is another corrugated or embossed or raised line $c$, extending unbroken around the other part $C^2$, of the inclosure C. The two parts $C', C^2$, of the inclosure are not of the same size, the one part $C'$, being adapted to fold entirely within the part $C^2$, if the sheet be folded along the middle line $a, a$.

When two sheets are placed face to face the border $b$, lies inside the border of the second sheet corresponding to the border $c$, of the drawings, and when two sheets are placed together the embossed representations of flies B, B, B, interlock and form intermeshing rows of elevations between the unbroken lines $b, c$, thus forming together a wide interlocking border line well adapted to confine the sticky material in its proper place.

The surfaces $C', C^2$, of the paper inside of the border line are coated with a sticky material. The surface of the paper outside of the border lines and embossed rows of pictures is left free of coating so that the paper may be readily handled.

The embossed representations of insects scattered over the surface of the paper serve a double purpose: first, to decoy live flies to the paper; and, second, to separate the main surfaces of the paper when two sheets are placed together, and prevent the sticky substance from being squeezed out from between the two sheets when under pressure in the packages. The second object of course is not attained when the picture is simply printed on the paper for the purpose of serving as a decoy.

The figures or pictures may be secured to the main sheet in any way as by printing or painting them on the main sheet or printing or painting them on a separate sheet from which the pictures are cut and the small pieces of paper containing the pictures are pasted on to the main sheet.

I am aware that sheets of paper have been prepared with border corrugations adapted to interlock, and hence I do not claim that as my invention, but What I do claim is—

1. A sheet of sticky fly paper having a raised border extending half around the same, a row of raised representations of flies in front of the border, a second raised border extending around the other half, and having a row of raised representations of flies on the outside, the respective representations being spaced, those on one side being opposite to the spaces between the representations on the opposite side, substantially as described.

2. A sheet of sticky fly paper having its inner surface coated with sticky material, and a border of raised representations of flies, substantially as described.

3. A sheet of sticky fly paper having its inner surface coated with sticky material and embossed and colored representations of insects arranged at intervals over the surface thereof, substantially as described.

4. A fly catching device consisting of a sheet of paper, raised imitations of flies on said paper, and a coating of translucent sticky material on said paper, whereby living flies are decoyed to the sticky material, substantially as shown and described.

In testimony whereof I sign this specification in the presence of two witnesses.

CHARLES H. MITCHAMORE.

Witnesses:
   CHAS. J. HAYDEN,
   C. E. UPHAM.